(12) United States Patent
Reiter

(10) Patent No.: US 7,196,993 B2
(45) Date of Patent: Mar. 27, 2007

(54) COPY PROTECTION SYSTEM FOR OPTICAL DISCS

(75) Inventor: Gottfried Reiter, Adnet (AT)

(73) Assignee: Sony DADC Austria AG, Anif (AT)

( * ) Notice: Subject to any disclaimer, the term of this patent is extended or adjusted under 35 U.S.C. 154(b) by 112 days.

(21) Appl. No.: 10/511,618

(22) PCT Filed: Apr. 4, 2003

(86) PCT No.: PCT/EP03/03554

§ 371 (c)(1),
(2), (4) Date: Oct. 15, 2004

(87) PCT Pub. No.: WO03/088239

PCT Pub. Date: Oct. 23, 2003

(65) Prior Publication Data

US 2005/0254382 A1    Nov. 17, 2005

(30) Foreign Application Priority Data

Apr. 17, 2002  (EP) .................................. 02008668

(51) Int. Cl.
  *G11B 5/58*  (2006.01)
(52) U.S. Cl. ................ 369/53.21; 369/47.12; 369/59.24; 369/47.21

(58) Field of Classification Search .................... None
See application file for complete search history.

(56) References Cited

U.S. PATENT DOCUMENTS

| | | | | |
|---|---|---|---|---|
| 5,699,434 | A * | 12/1997 | Hogan | 705/57 |
| 7,030,788 | B2 * | 4/2006 | Aida et al. | 341/59 |
| 2001/0038578 | A1 * | 11/2001 | Oshima | 369/13 |
| 2002/0076046 | A1 * | 6/2002 | Heylen | 380/203 |
| 2002/0110071 | A1 * | 8/2002 | Oki et al. | 369/59.24 |

* cited by examiner

*Primary Examiner*—Wayne Young
*Assistant Examiner*—Minerva Rivero
(74) *Attorney, Agent, or Firm*—Oblon, Spivak, McClelland, Maier & Neustadt, P.C.

(57) ABSTRACT

A system for copy protection of record carriers for digital data is described according to which at least one predetermined repetitive bit pattern which encodes into channel bits having an accumulated digital sum value that exceeds a first predetermined limit and that is below a second predetermined limit is determined and recorded onto said record carrier by a mastering process so that said accumulated digital sum value which exceeds said first predetermined limit and is below said second predetermined limit is achieved in said at least one replaced and/or inserted part.

11 Claims, 13 Drawing Sheets

70h|3 merging bits|01h|3 merging bits|70h|3 merging bits|01h|3 merging bits
10000000010001000000000010000000001000100000000100001000000000100

D9h|3 merging bits|7Ah|3 merging bits|D9h|3 merging bits|7Ah|3 merging bits
10000000001000100100100000001000000000100010010010000000010000

Fig. 2

COPY PROTECTION SYSTEM FOR OPTICAL DISCS

BACKGROUND OF THE INVENTION

1. Field of the Invention

The present invention relates to a copy protection method for record carriers, i.e. storage media, which store digital data as an asynchronous signal, e.g. Compact Discs (CDs) and Digital Versatile Discs (DVDs) including all existing or future formats of CD and DVD or other Optical Storage Media which work according to a similar concept.

In particular, the copy protection method according to the present invention allows to make a physical copy or creating a complete data image of the media content, but the physical copy itself is not accessible anymore or the access is disturbed or that the error rate is increased dramatically so that e.g. listening to the music content of a copied audio CD is not entertaining anymore.

2. Discussion of the Background

Optical storage discs with information stored on one or both sides have come to be used for a variety of purposes, most notably in the music, games, video, and computer industry. Digital information is stored on the optical storage media in the form of pits arranged along circular, concentric tracks on one or on both sides of the disc. The track is typically read from the inside out, but may also be read from outside in, as it is already used for some optical storage media.

The data itself on the track is subdivided into frames, each equal in length, containing equal amounts of information. Each frame has a dedicated layout depending on the type of optical storage media (CD, DVD). Such a frame always contains the user data symbols itself but may also contain data for synchronization, merging data between data symbols and error correction.

The signal on a optical storage medium itself is asynchronous, which means that in the decoding process synchronization, timing information, parity data or other data has to be spied out from the signal.

Due to the nature of such storage media copies can be made easily. To cope with this situation, there exist various copy protection schemes which try to prevent unauthorized access with the help of keys or passwords stored on the respective storage medium itself. Further, there exist methods which secure an optical disc with the help of stored invalid information which gets repaired during the copy process so that an application program can determine whether it is stored on an original or on a copy based on the presence or absence of this invalid information.

Further, U.S. Pat. No. 6,005,839 describes a copy protection scheme for optical record carriers, in particular DVDs, according to which direct or dump copying is prohibited by inserting a synchronization pattern at an irregular position different from the regular position or by inserting a synchronization pattern different to the standard synchronization pattern at the regular position of certain areas or sectors of the optical record carrier. To assure an undisturbed reproduction of such a record carrier the reproducing obstructing area created with the misleading synchronization patterns is skipped by jumping based on position designating information (designating the reproducing obstructing area) which is recorded on the record carrier, preferably in the Table Of Contents (TOC) area.

Further, according to WO 01/78074 which content is herewith incorporated into this specification, additionally generated data which confuses a reading device gets written to at least one specific portion of the record carrier, e.g. the beginning of a sequence, so that a general purpose reading device which can access record carriers of different formats, e.g. a CD-ROM, which accesses said record carrier judges said record carrier to be inaccessible, i.e. that a record carrier according to that teaching comprises at least one specific portion with such additionally generated data.

Therewith, according to that teaching such additionally generated data which confuses a reading device is inserted in such areas which are not accessed by a reading device designed for that type of record carriers, e.g. a normal audio CD player for audio CDs, but which are always accessed by a general purpose reading device, e.g. a CD-ROM reading device, so that these reading devices will abort the reading or access of the record carrier.

However, due to the fact that such record carriers are generally not accessible by e.g. CD-ROM reading devices, users who want to also use these record carriers on their computers are not satisfied.

U.S. Pat. No. 5,699,434 which content is herewith included by reference into this specification discloses a method of inhibiting copying of digital data according to which a sequence of symbols is added to the original data, wherein the sequence of symbols is selected to encode into channel bits having a large accumulated digital sum variance (DSV). The sequence of symbols is then encoded by a special encoder that generates special channel bits that do not have a large accumulated digital sum variance so that no playback problems will occur. However, in case of a normal encoding of the accessed data including the added sequence of symbols for the purpose of copying or further recording, i.e. a re-encoding, channel bits having a large accumulated digital sum variance will be likely generated. The generated digital sum values can be used to encode additional data, e.g. by their sign, so that other encoders will encode the same original data into channel bits that do not include this additional data which might be used for decrypting, descrambling or otherwise modifying the original data. Further, it is stated that other encoders might also encode the same original data in channel bits that cannot be recovered.

However, according to this copy protection method always a special encoder is necessary adapted to encode the selected sequence of symbols which would normally encode into channel bits having an accumulated digital sum variance that exceeds a predetermined limit non-optimally into channel bits having an accumulated digital sum variance that does not exceed the predetermined limit. Due to the needed special design such an encoding can become costly.

SUMMARY OF THE INVENTION

Therefore, it is the object underlying the present invention to provide a further copy protection system for record carriers which store digital data as an asynchronous signal.

The method to produce a copy protected record carrier for digital data according to the present invention comprises the steps of:

determining at least one predetermined repetitive bit pattern which encodes into channel bits having an accumulated digital sum value that exceeds a first predetermined limit and that is below a second predetermined limit, replacing at least one part of the digital data to be recorded by the at least one predetermined repetitive bit pattern and/or inserting the at least one predetermined repetitive bit pattern into at least one part of the digital data to be recorded, and transferring said digital data including the at least one replaced and/or inserted part onto said record carrier by a mastering process so that said accumulated digital sum value which exceeds said first predetermined limit and is below said second predetermined limit is achieved in said at least one replaced and/or inserted part.

Therewith, according to the present invention at least one predetermined bit pattern is included on at least one part of an optical record carrier, which effects therein a generation of a predetermined ratio above the average ratio of successively following pits or lands due to the exceeding of the digital sum value or running digital sum (RDS) above a first predetermined limit, since in a ideal case the digital sum value is equal to zero. On the other hand, due to the definition of the second predetermined limit, accessibility of the record carrier produced according to the present invention is secured, although tolerable or correctable errors might be included. The first predetermined limit should be chosen so that the accumulated effects of the digital sum value exceeding said first predetermined limit and a boosting of the tracking servo disturbance resulting therefrom when a copy of the predetermined bit pattern is recorded onto a recordable record carrier assures that the copy is not accessible or the access is disturbed so that e.g. listening to the music content of a copied audio CD is not entertaining anymore. This boosting might be an effect of an interference between the signal of the wobbled groove of a recordable optical record carrier and the track following signal coming of the regular pit/land pattern resulting from the regular bit pattern.

In case of an audio CD the predetermined bit pattern is preferably included, i.e. inserted or replacing other digital data, so that:
  different predetermined bit patterns might be used for different audio channels,
  at least one part of the digital data to be replaced might correspond to silence of digital audio data,
  at least one part of the digital data to be replaced might be arranged in a portion of the record carrier which is the target position for a (possible) jump of the reading beam,
  at least one part of the digital data to be replaced might be arranged in an introductory portion of a track (song) of digital audio data, and/or
  at least one part of the digital data to be replaced might be arranged in an end portion of a track (song) of digital audio data.

The predetermined bit pattern is repetitive, i.e. a predetermined number of bits is repeated a predetermined amount of times so that the replaced or inserted part preferably fulfils the following requirements:
  long enough to properly disturb access or lead to abortion of access,
  in case of audio a non or hardly hearable signal is generated, further preferably bit patterns corresponding to ramp signals are also included within the replaced or inserted part before and after the repetitive bit pattern so that a smooth transition to and from the signal corresponding to the inserted part is ensured, and/or
  the order of the repetitive bit pattern results into a regular bit pattern after interleaving according to the CIRC encoder described in the Red Book or IEC-908, respectively.

In case of a CD-ROM the predetermined bit pattern is preferably included, i.e. inserted or replacing other digital data, so that:
  at least one part of the digital data to be replaced might correspond to those areas which are filled by 0-data, normally,
  at least one part of the digital data to be replaced might be arranged in a position of the record carrier which is the target position for a (possible) jump of the reading beam,
  at least one part of the digital data to be replaced or inserted might be arranged in a portion of the record carrier which is not accessed by the reading beam during normal access of the record carrier,
  at least one part of the digital data to be replaced or inserted might be arranged at the end of a data file or directory record as dummy data.

In the method according to the present invention, said predetermined repetitive bit pattern is preferably selected so that an abnormal writing beam deviation from the ideal position of a writing beam of a record carrier recording device for recordable record carriers which writing beam deviation is big enough to ensure that a writing process will be aborted or disturbed.

Alternatively or additionally, in the method according to the present invention, said predetermined repetitive bit pattern is preferably selected so that an abnormal reading beam deviation from the ideal position of a reading beam of a record carrier reading device which reads a copy of the copy protected record carrier recorded on a recordable record carrier which reading beam deviation is big enough to ensure that a reading process will be aborted or disturbed.

Further alternatively or additionally, in the method according to the present invention, said predetermined repetitive bit pattern is preferably selected so that an abnormal writing beam deviation from the ideal position of a writing beam of a record carrier recording device for recordable record carriers and is selected so that an abnormal reading beam deviation from the ideal position of a reading beam of a record carrier reading device which reads a copy of the copy protected record carrier recorded on a recordable record carrier wherein the combined effect of writing beam deviation and reading beam deviation is big enough to ensure that a reading process will be aborted or disturbed.

Still further alternatively or additionally, in the method according to the present invention, said predetermined repetitive bit pattern is preferably selected so that an abnormal reading beam deviation from the ideal position of the reading beam of a record carrier reading device which reads the copy protected record carrier which deviation is small enough to ensure a readability of the copy protected record carrier. As mentioned above, readability is to be understood in the sense that reading errors are tolerable or correctable.

Still further alternatively or additionally, in the method according to the present invention, said predetermined repetitive bit pattern is preferably selected so that merge bits are predefined and therefore not changeable by the recording electronic of a recorder due to design rules of the digital data content of the record carrier. This case includes that the merge bits might be selected from the recording electronic of the recorder from a group of predefined merge bits which all fulfil the requirements according to the present invention, i.e. which all lead to the desired effect, even if the recording electronic selects those merge bits which result in the lowest possible digital sum value. Such a group of predefined merge bits might be 100, 010, 001 which all have the same effect that the status of the following bits gets inverted, but the position of the inversion is changed. Due to this "variable" position also the digital sum value is variable within certain limits. In general the recording electronic of the recorder will select those merge bits which will lead to the lowest digital sum value, which, however, can be chosen on basis of the predetermined repetitive bit pattern to fulfil the requirements according to the present invention.

Still further alternatively or additionally, in the method according to the present invention, said predetermined repetitive bit pattern is preferably selected so that the signal corresponding to the digital data shows a certain positive or negative digital sum value within a predefined time.

Still further alternatively or additionally, in the method according to the present invention, in case of audio, said predetermined repetitive bit pattern is preferably selected so that a low analog audio DC value is achieved.

Still further alternatively or additionally, in the method according to the present invention, in case of audio, said predetermined repetitive bit pattern is preferably selected so that an equal analog audio DC value in all audio channels is achieved.

Still further alternatively or additionally, in the method according to the present invention, in case of audio, said predetermined repetitive bit pattern is preferably selected so that an audio output signal corresponding to the digital data is achieved, which analog audio output signal has a frequency and/or amplitude which cannot be heard or can hardly be heard by humans.

Still further alternatively or additionally, in the method according to the present invention, in case of audio, preferably before and after said predetermined repetitive bit pattern a ramp signal is added which ensures a smooth transition from and to the digital data signal content before and after the signal content of the predetermined repetitive bit pattern.

A corresponding computer program product according to the present invention comprises computer program means adapted to perform the method steps as defined above or parts thereof when being executed on a computer, digital signal processor, or the like. In particular, parts of the method steps is to be understood in the sense that the determining at least one predetermined repetitive bit pattern needs not to be performed by the computer program product according to the present invention, i.e. that the predetermined repetitive bit pattern might be determined outside the computer program product, e.g. by way of trial and error. Of course, respective predetermined bit patterns might also be determined by the computer program product according to the present invention according to design rules as set out above.

A device to produce a record carrier with copy protection according to the present invention comprises
  a first unit for replacing at least one part of the digital data to be recorded by at least one predetermined repetitive bit pattern and/or for inserting at least one predetermined repetitive bit pattern into at least one part of the digital data to be recorded, wherein said repetitive bit pattern encodes into channel bits having an accumulated digital sum value that exceeds a first predetermined limit and that is below a second predetermined limit, and
  a second unit for transferring said digital data including the at least one replaced and/or inserted part to a record carrier production unit which produces said record carrier by a mastering process so that said accumulated digital sum value that exceeds a first predetermined limit and is below a second predetermined limit is achieved in said at least one replaced and/or inserted part.

The predetermined repetitive bit pattern might be generated and/or comprise the characteristics as described above in connection with the method according to the invention.

A copy protected record carrier according to the present invention comprises at least one part comprising at least one predetermined repetitive bit pattern which encodes into channel bits having an accumulated digital sum value that exceeds a first predetermined limit and is below a second predetermined limit.

The predetermined repetitive bit pattern might be generated and/or comprise the characteristics as described above in connection with the method according to the invention. The record carrier according to the present invention is preferably an optical record carrier, e.g. a CD or DVD.

The copy protection system according to the present invention could be overcome by a removal, replacement or reencoding of the predetermined repetitive bit pattern(s) according to the present invention which are included on a record carrier according to the present invention. To achieve this, the predetermined repetitive bit patterns according to the present invention have to be searched and processed.

Therefore, a method to copy digital data stored on a record carrier with copy protection onto a recordable record carrier according to the present invention comprises the following steps:
  searching for at least one part of digital data to be copied onto said recordable record carrier comprising at least one predetermined repetitive bit pattern which would encode into channel bits having an accumulated digital sum value that exceeds a first predetermined limit and is below a second predetermined limit, and
  replacing said at least one part by a bit pattern which encodes into channel bits having an accumulated digital sum value that is below said first predetermined limit, or for deleting said at least one part.

Alternatively, a method to copy digital data stored on a record carrier with copy protection onto a recordable record carrier according to the present invention comprises the following steps:
  searching for at least one part of digital data to be copied onto said recordable record carrier comprising at least one predetermined repetitive bit pattern which would optimally encode into channel bits having an accumulated digital sum value that exceeds a first predetermined limit and is below a second predetermined limit, and
  encoding said at least one part non optimal into channel bits having an accumulated digital sum value that is below said first predetermined limit.

A corresponding computer program product according to the present invention, comprising computer program means adapted to perform the method steps as defined in the both paragraphs above when being executed on a computer, digital signal processor, or the like.

A computer storage means according to the present invention comprises a computer program product according to the above paragraph.

Further, a device to copy digital data stored on a record carrier with copy protection onto a recordable record carrier according to the present invention comprises
  a searching unit to search for at least one part of digital data to be copied onto said recordable record carrier comprising at least one predetermined repetitive bit pattern which would encode into channel bits having an accumulated digital sum value that exceeds a first predetermined limit and is below a second predetermined limit, and a replacement unit for replacing said at least one part by a bit pattern which encodes into channel bits having an accumulated digital sum value that is below said first predetermined limit, or for deleting said at least one part.

Alternatively, a device to copy digital data stored on a record carrier with copy protection onto a recordable record carrier according to the present invention comprises a searching unit to search for at least one part of digital data to be copied onto said recordable record carrier comprising at least one predetermined repetitive bit pattern which would optimally encode into channel bits having an accumulated digital sum value that exceeds a first predetermined limit and is below a second predetermined limit, and an encoding unit for encoding said at least one part non optimal into channel bits having an accumulated digital sum value that is below said first predetermined limit.

In this specification the term channel bits is used for the bit pattern that satisfies the various constraints for digital data as an asynchronous signal, such as a trade-off between recording density and error rate, the highest permissible transition frequency, self-clocking, the NonReturn to Zero Inverted (NRZI) format which has a run length limited (RLL) code, e.g. for compact discs usually the (2,10)-RLL, which means that the number of consecutive zeros in the encoded bit pattern must be at least 2 and no greater than 10, an requirement for a limit on the low frequency content of the read signal, and so on.

According to the present invention advantage is taken from the effect that reading devices do not fail to correctly read record carriers which comprise bit patterns which show an accumulated digital sum value that exceeds a first predetermined limit and that has to be below a second predetermined limit. When now determining the first predetermined limit so that upon recording this bit pattern onto a recordable record carrier automatically the above described boosting of the tracking servo disturbance assures that the copy is not accessible or the access is disturbed so that e.g. listening to the music content of a copied audio CD is not entertaining anymore. Therefore, the record carriers according to the present invention which are produced on basis of a mastering process can be accessed by corresponding record carrier reading devices due to the fact that the accumulated digital sum value lies below said second predetermined limit and no such boosting occurs, but copies thereof obtained by recording on a corresponding recordable record carrier cannot be properly accessed.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiment given below, serve to explain the principles of the invention, wherein:

FIG. 2 illustrates two cycles of one repetitive bit pattern according to the present invention.

DESCRIPTION OF THE PREFERRED EMBODIMENT

The following description shows as an example how to modify the physical data stream of an audio CD to prevent copying the audio CD on a CD-R. The format of the physical data stream is specified in the 'Red Book' specification and IEC 908.

The physical data stream on a CD is optimized in multiple ways to reduce errors and guarantee a simple decoding mechanism. Therefore every 3 to 11 bits must be a transition of the signal. Within the data symbols this is guaranteed by the EFM (Eight-to-Fourteen Modulation). The audio data is split into 8 bit symbols which are converted to a 14 bit symbol with the EFM table. This table consist of 256 entries of 14 bit values which are combinations of bits which contain more than 2 but less than 10 zeros continuously. Every '1' in the 14 bit symbol represents a transition of the signal. To also guarantee this restriction when symbols are concatenated there are additional 3 bits of merging, which must be chosen accordingly. On a CD these transitions can be seen in form of pits and lands. The length of each is bounded between 3 and 11 times the base length.

The final frame of audio data, i.e. CD Raw sector, contains the following data:

| | |
|---|---|
| 1 synchronization symbol | 24 bits |
| 1 subcode byte | 14 bits (EFM encoded) |
| 24 data bytes | 336 bits (EFM encoded) |
| 8 parity bytes | 112 bits (EFM encoded) |
| 34*3 merging bits | 102 bits |
| TOTAL | 588 bits |

Figure 1:
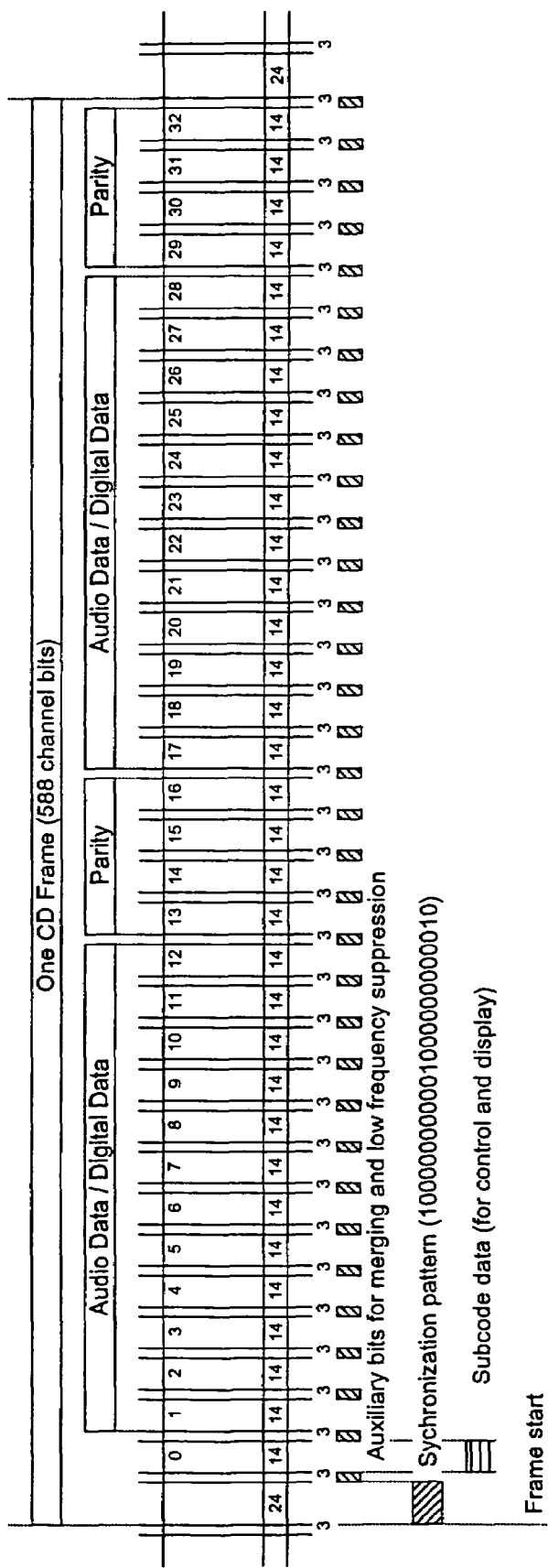
FIG. 1 illustrates a CD frame comprising 588 channel bits.

These bits, i.e. channel bits which fulfil the various constraints of digital recording as indicated above, are composed in the way as shown in FIG. 1. The order of one CD frame is as follows: the synchronization pattern of 24 bits is followed by 3 auxiliary bits for merging and low frequency suppression; thereafter 14 bits subcode data are followed by 3 auxiliary bits for merging and low frequency suppression; thereafter 12 blocks of 14 bits information data are respectively followed by 3 auxiliary bits for merging and low frequency suppression; thereafter 4 blocks of 14 bits parity data are respectively followed by 3 auxiliary bits for merging and low frequency suppression; thereafter 12 blocks of 14 bits information data are respectively followed by 3 auxiliary bits for merging and low frequency suppression; and finally 4 blocks of 14 bits parity data are respectively followed by 3 auxiliary bits for merging and low frequency suppression.

As mentioned above, according to the present invention a repetitive bit pattern is inserted into the data stream (which can be audio samples or digital data), or predetermined data, e.g. in case of audio such audio samples corresponding to silence, is replaced by the predetermined bit pattern to ensure that the reading process of a copy of the mastered record carrier including said repetitive predetermined bit pattern will be aborted or disturbed. As also mentioned above, this is achieved by securing that the predetermined repetitive bit pattern effects a generation of a pit and land pattern on the record carrier which is not equally distributed, i.e. which shows either more pit parts than land parts or more land parts than pit parts. This is basically achieved by choosing values for the replaced or inserted "audio or data samples" which result after the EFM in a predetermined bit pattern which preferably fulfils the requirement that only predetermined merging bits can be inserted between the bits corresponding to the audio samples due to the (2,10)-RLL requirement for normally ensuring no mismatch of pit parts and land parts, but according to the invention is used to ensure the mismatch of pit parts and land parts.

In the following two example of such replaced or inserted "audio sample values" will be given in reference to FIGS. 2 to 4.

As inserted "audio sample" values which are inserted or which replace at least one part of the digital data to be recorded, i.e. audio samples of e.g. silence, in the first example, shown in FIG. 2a, the hexadecimal values 70 and 01 are used. The combined value 7001h (h shows the hexadecimal notation) will be at least once repeated a predetermined amount of times so that at least one part of the record carrier comprises the accumulated digital sum value that exceeds a first predetermined limit and that is below the second predetermined limit.

The value 70h corresponds to the bit pattern 01110000b (b shows the binary notation) and the value 01h corresponds to the bit pattern 00000001b. After the EFM the bit pattern 01110000b is converted into the bit pattern 10000000100010b and the bit pattern 00000001b is converted into the bit pattern 10000100000000b.

Due to the (2,10)-RLL requirement the three merging bits (the merging bits are underlined in FIG. 2) between the EFM bit pattern 10000000100010 and the EFM bit pattern 10000100000000 can only be selected to 000 and the three merging bits between the EFM bit pattern 10000100000000 and the EFM bit pattern 10000000100010 can only be selected to 100.

The resulting channel bits for these two repetitive successively following audio samples result in a bit stream as indicated in the bottom of FIG. 2a which have a distribution corresponding to 22 bits low (pit or land) and 12 bits high (land or pit), i.e. 22:12 instead of the ideal distribution of 17:17.

Figure 3A:
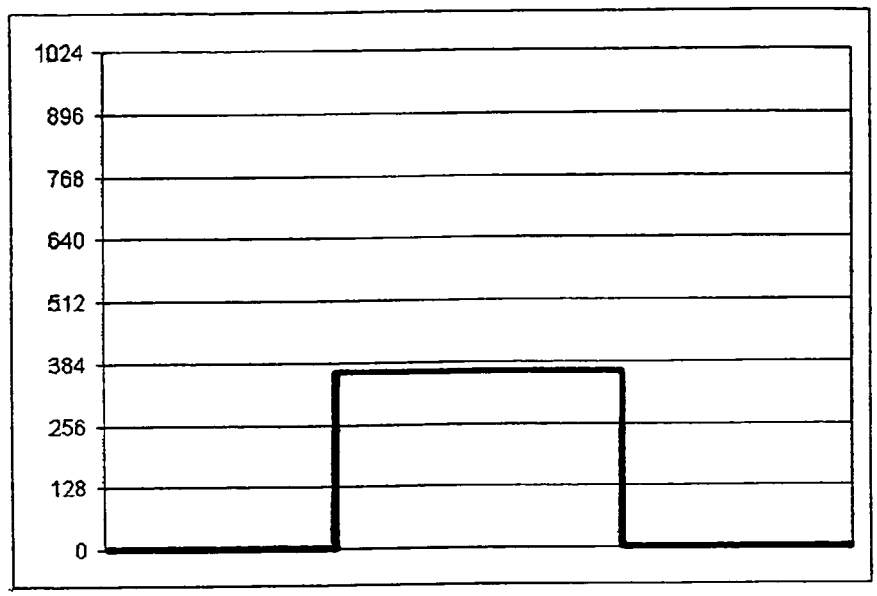
FIG. 3 illustrates an audio DC value corresponding to a first repetitive bit pattern with and without ramp signal according to the present invention.
Figure 3B:
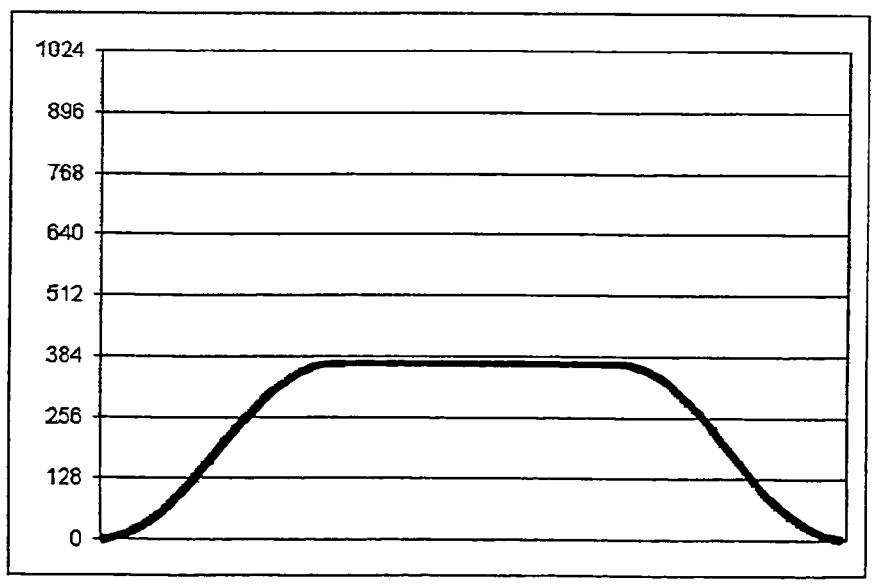

The audio DC value corresponding to the repetitive bit pattern 7001h is comparatively low, i.e. a value 368 is achieved when the maximum achievable value is defined to 32768. This audio DC value is shown in FIG. 3, wherein FIG. 3a shows the resulting audio DC value achieved with insertion/replacement of predetermined audio samples by only the predetermined repetitive bit pattern 7001h and FIG. 3b shows the resulting audio DC value achieved with insertion/replacement of predetermined audio samples by the predetermined repetitive bit pattern 7001h with preceding and succeeding ramp signal which assures a smooth (not hearable) transition from and to the audio DC values preceding and succeeding the inserted/replaced part, in this case from and to an audio DC value zero.

As inserted "audio sample" values which are inserted or which replace at least one part of the digital data to be recorded, i.e. audio samples of e.g. silence, in the second example, shown in FIG. 2b, the hexadecimal values D9 and 7A are used. As in the first example, the combined value D97Ah will be at least once repeated a predetermined amount of times so that at least one part of the record carrier comprises the accumulated digital sum value that exceeds a first predetermined limit and that is below the second predetermined limit.

The value D9h corresponds to the bit pattern 11011001b and the value 7Ah corresponds to the bit pattern 01111010b. After the EFM the bit pattern 11011001b is converted into the bit pattern 10000000010001b and the bit pattern 01111010b is converted into the bit pattern 10010000000010b.

Due to the (2,10)-RLL requirement the three merging bits (the merging bits are underlined in FIG. 2) between the EFM bit pattern 10000000010001 and the EFM bit pattern 10010000000010 can only be selected to 000 and the three merging bits between the EFM bit pattern 10010000000010 and the EFM bit pattern 10000000010001 can also only be selected to 000.

The resulting channel bits for these two repetitive successively following audio samples result in a bit stream as indicated in the bottom of FIG. 2b which have a distribution corresponding to 12 bits low (pit or land) and 22 bits high (land or pit), i.e. 12:22 instead of the ideal distribution of 17:17.

Figure 4A:
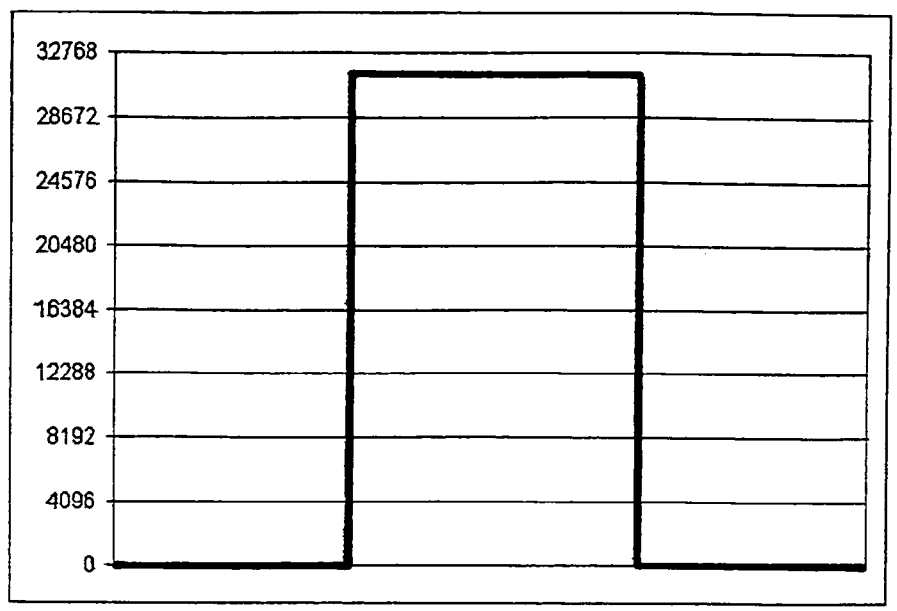
FIG. 4 illustrates an audio DC value corresponding to a second repetitive bit pattern with and without ramp signal according to the present invention.
Figure 4B:
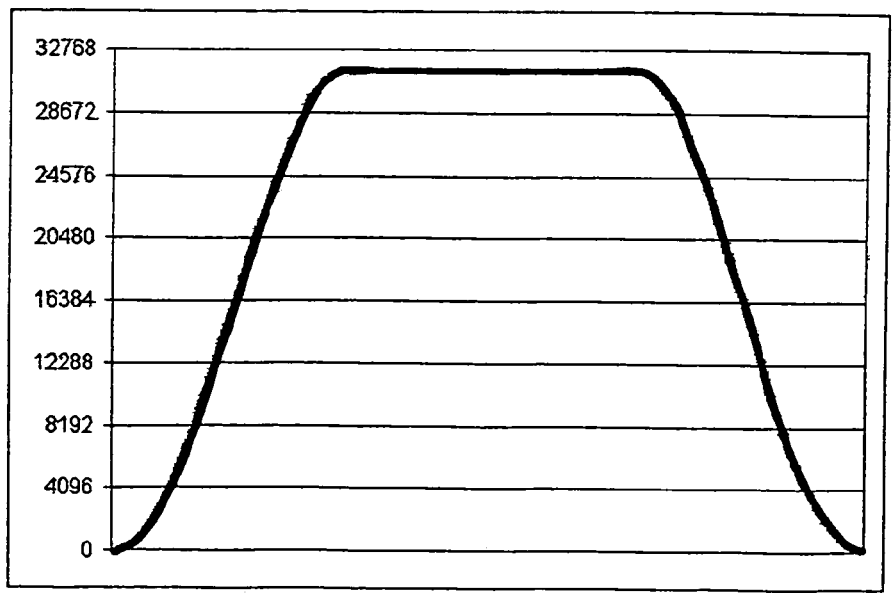

The audio DC value corresponding to the repetitive bit pattern D97Ah is comparatively high, i.e. a value 31449 is achieved when the maximum achievable value is defined to 32768. This audio DC value is shown in FIG. 4, wherein FIG. 4a shows the resulting audio DC value achieved with insertion/replacement of predetermined audio samples by only the predetermined repetitive bit pattern D97Ah and FIG. 4b shows the resulting audio DC value achieved with insertion/replacement of predetermined audio samples by the predetermined repetitive bit pattern D97Ah with preceding and succeeding ramp signal which assures a smooth (not hearable) transition from and to the audio DC values preceding and succeeding the inserted/replaced part, in this case from and to an audio DC value zero.

Of course, many other combinations of audio sample values or digital data sample values are possible which fulfil the general requirement of encoding into channel bits having an the accumulated digital sum value that exceeds said first predetermined limit and is below said second predetermined limit.

Figure 5:
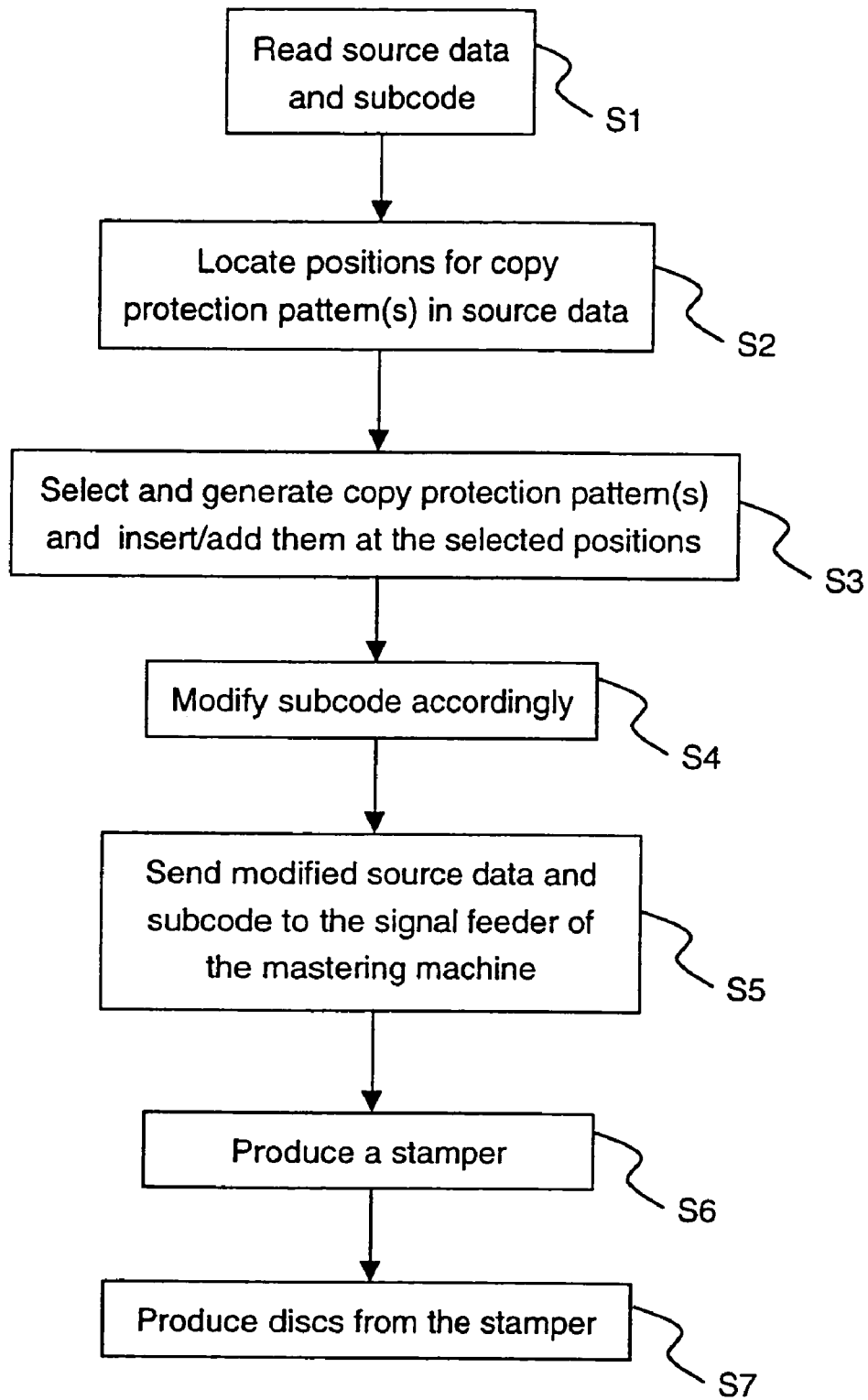
FIG. 5 illustrates a flow chart elucidating a first possibility to produce an audio record carrier according to the present invention.

FIG. 5 illustrates a flow chart elucidating a first possibility to produce an audio record carrier according to the present invention. In a first step S1 the source data and subcode to be recorded is read, e.g. from a data base storing the desired audio content and subcode data. Thereafter, in a second step S2 positions where the copy protection pattern(s) according to the present invention should be inserted in the source data, i.e. the audio data, are located, e.g. before and/or after a music track and/or in a pause portion. Following the location of the positions, the copy protection patterns are selected and generated in a third step S3 in which they are also inserted or added at the selected positions of the source data. In a next fourth step S4 the subcode gets modified accordingly, e.g. start time information is adapted. Further, in a following fifth step S5 the modified source data (including the copy protection patterns) and the modified subcode is sent to the signal feeder of the mastering machine. Finally, in a sixth step S6 all steps necessary to produce a stamper are performed and in a seventh step S7 discs are produced from the stamper.

Figure 6:
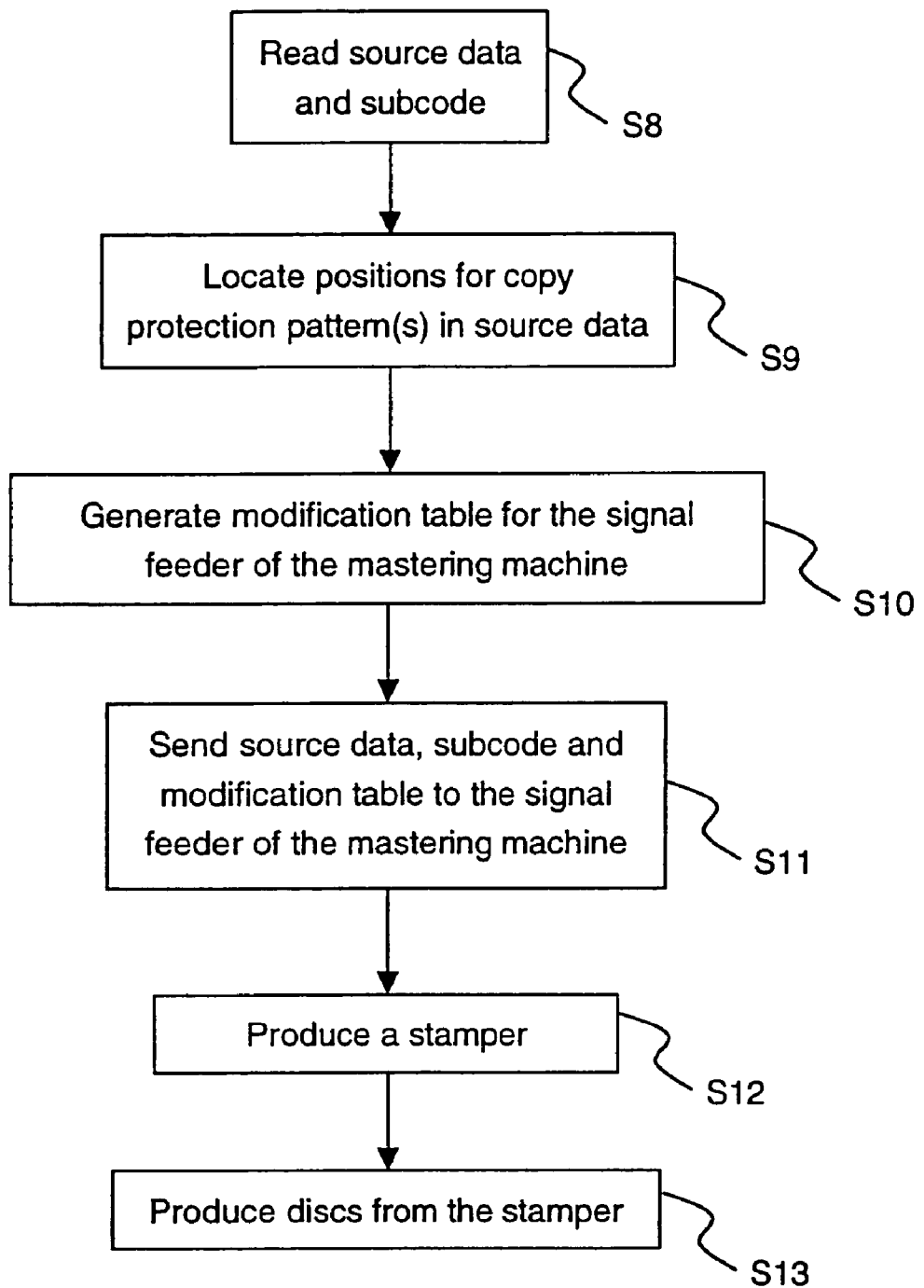
FIG. 6 illustrates a flow chart elucidating a second possibility to produce an audio record carrier according to the present invention.

FIG. 6 illustrates a flow chart elucidating a second possibility to produce an audio record carrier according to the present invention. In a first step S8 the source data and subcode to be recorded is read (similar to first the step S1 of the first possibility shown in FIG. 5). Thereafter, in a second step S9 positions where the copy protection pattern(s) according to the present invention should be inserted in the source data are located (similar to the second step S2 of the first possibility shown in FIG. 5). Following the location of the positions, a modification table for the signal feeder of the mastering machine is generated in a third step S10. The modification table includes the location of the copy protection patterns as well as these patterns itself. Further, also subcode modifications are included, if necessary. Finally, in a fourth step S11 all steps necessary to produce a stamper are performed and in a fifth step S12 discs are produced from the stamper (similar to the sixth step S6 and the seventh step S7 of the first possibility shown in FIG. 5).

Figure 7:
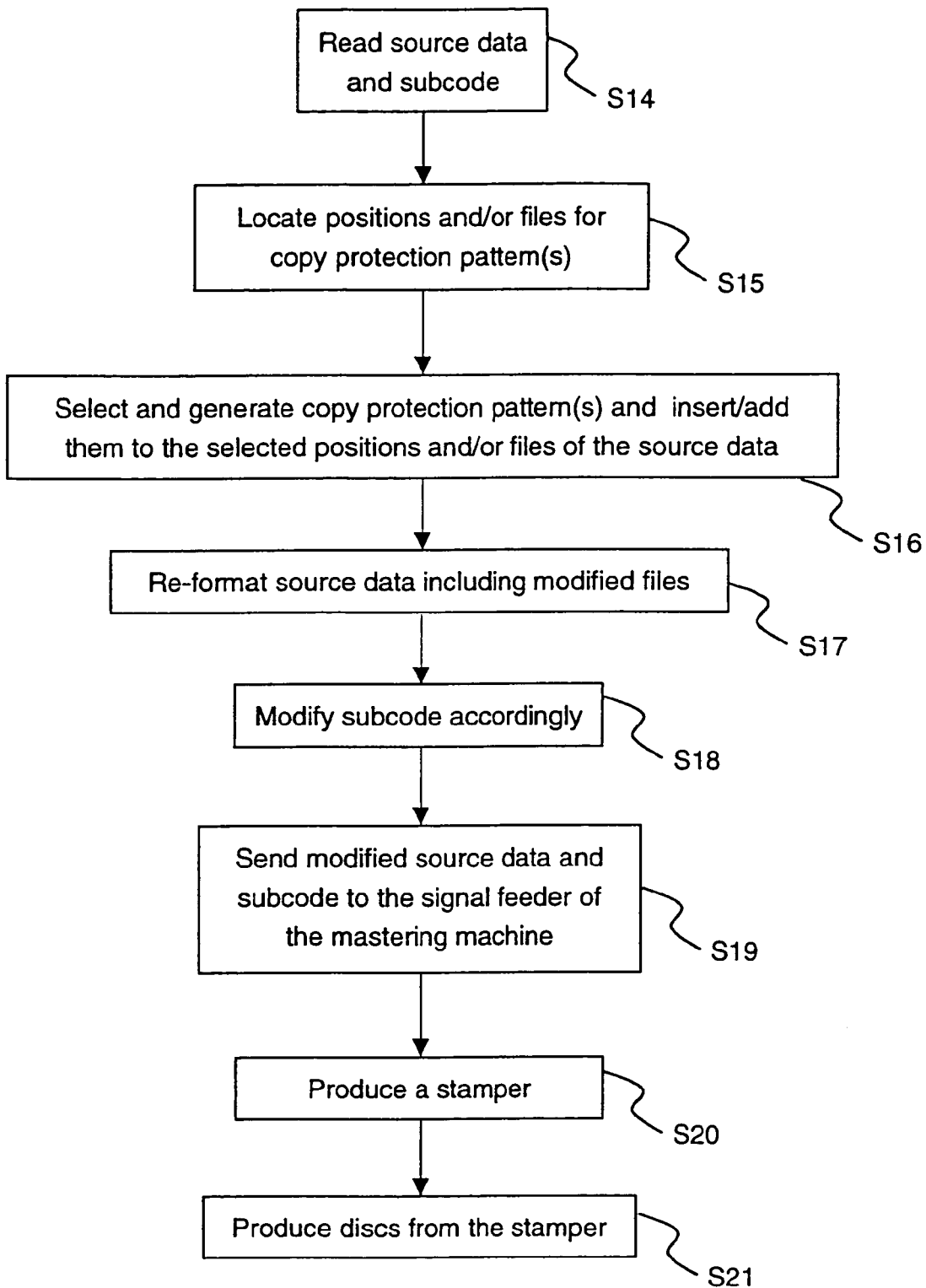
FIG. 7 illustrates a flow chart elucidating a possibility to produce a digital data record carrier according to the present invention.

FIG. 7 illustrates a flow chart elucidating a possibility to produce a digital data record carrier according to the present invention. In a first step S14 the source data and subcode to be recorded is read, e.g. from a data base storing the desired digital data content (similar to first the step S1 of the first possibility shown in FIG. 5). Thereafter, in a second step S15 positions and/or files where the copy protection pattern(s) according to the present invention should be inserted in the source data are located. Following the location of the positions and/or files, the copy protection patterns are selected and generated in a third step S16 in which they are also inserted or added at the selected positions and/or the selected files of the source data. In a following fourth step S17 the source data including the eventually modified files are re-formatted. In a next fifth step S18 the subcode gets modified accordingly, e.g. start time information is adapted. Further, in a following sixth step S19 the modified source data (including the copy protection patterns) and the modified subcode is sent to the signal feeder of the mastering machine. Finally, in a seventh step S20 all steps necessary to produce a stamper are performed and in a eighth step S21 discs are produced from the stamper (the fifth to eighth steps S18 to S21 are similar to the fourth to seventh steps S4 to S7 of the first possibility to produce an optical audio record carrier shown in FIG. 5).

Figure 8:
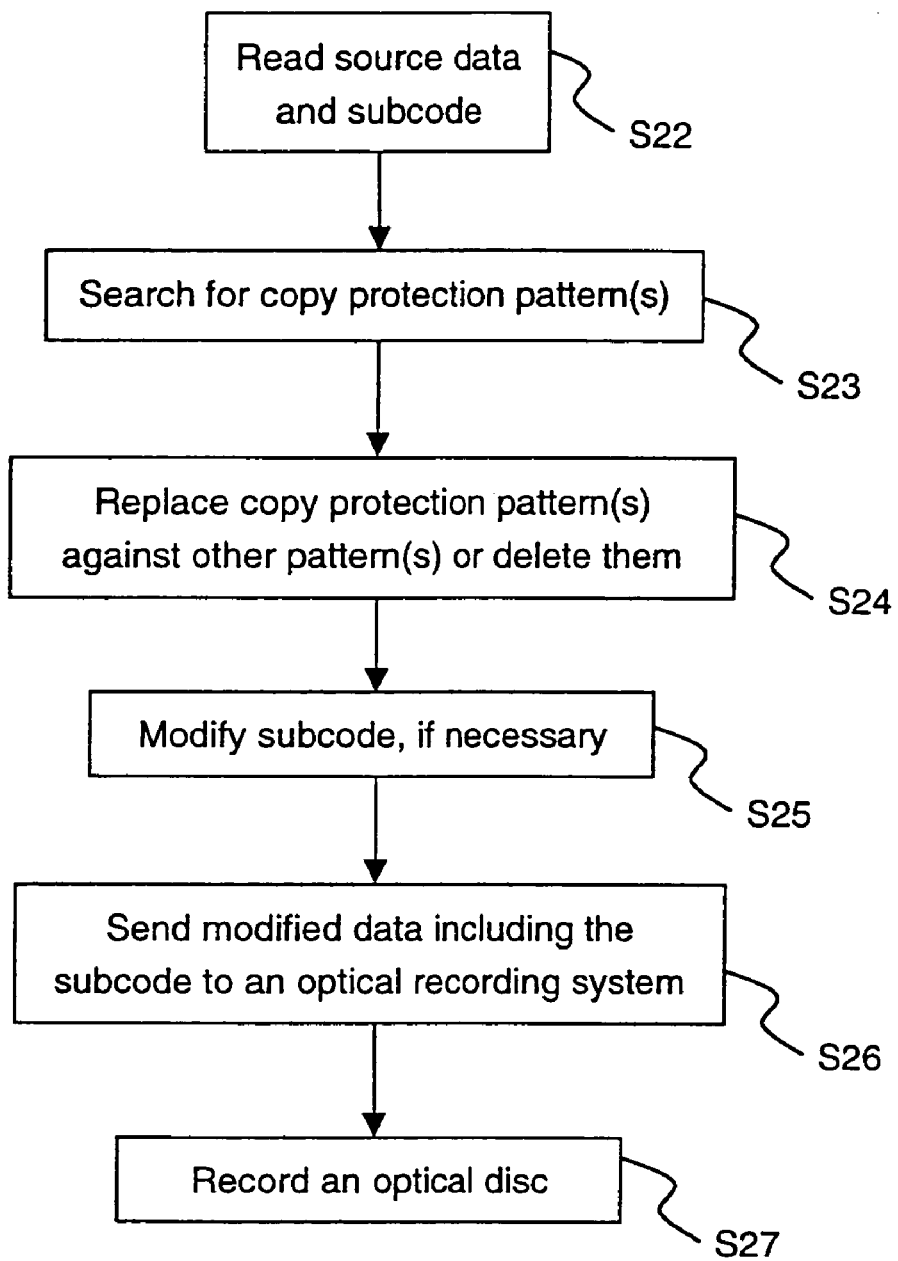
FIG. 8 illustrates a flow chart elucidating a first possibility to copy an audio record carrier according to the present invention.

FIG. 8 illustrates a flow chart elucidating a first possibility to copy an audio record carrier according to the present invention. In a first step S22 the source data and subcode to be copied is read, e.g. from an original audio record carrier or a data base storing the content of an original audio record carrier. Thereafter, in a second step S23 copy protection pattern(s) according to the present invention are searched. Following the searching of the copy protection patterns, these patterns are replaced against other patterns or deleted in a third step S24. In a next fourth step S25 the subcode gets modified, if this is necessary, e.g. start time information is adapted. Further, in a following fifth step S26 the modified source data and the eventually modified subcode is sent to an optical recording system, e.g. of a PC. Finally, in a sixth step S27 an optical disc is recorded by the optical recording system.

Figure 9:
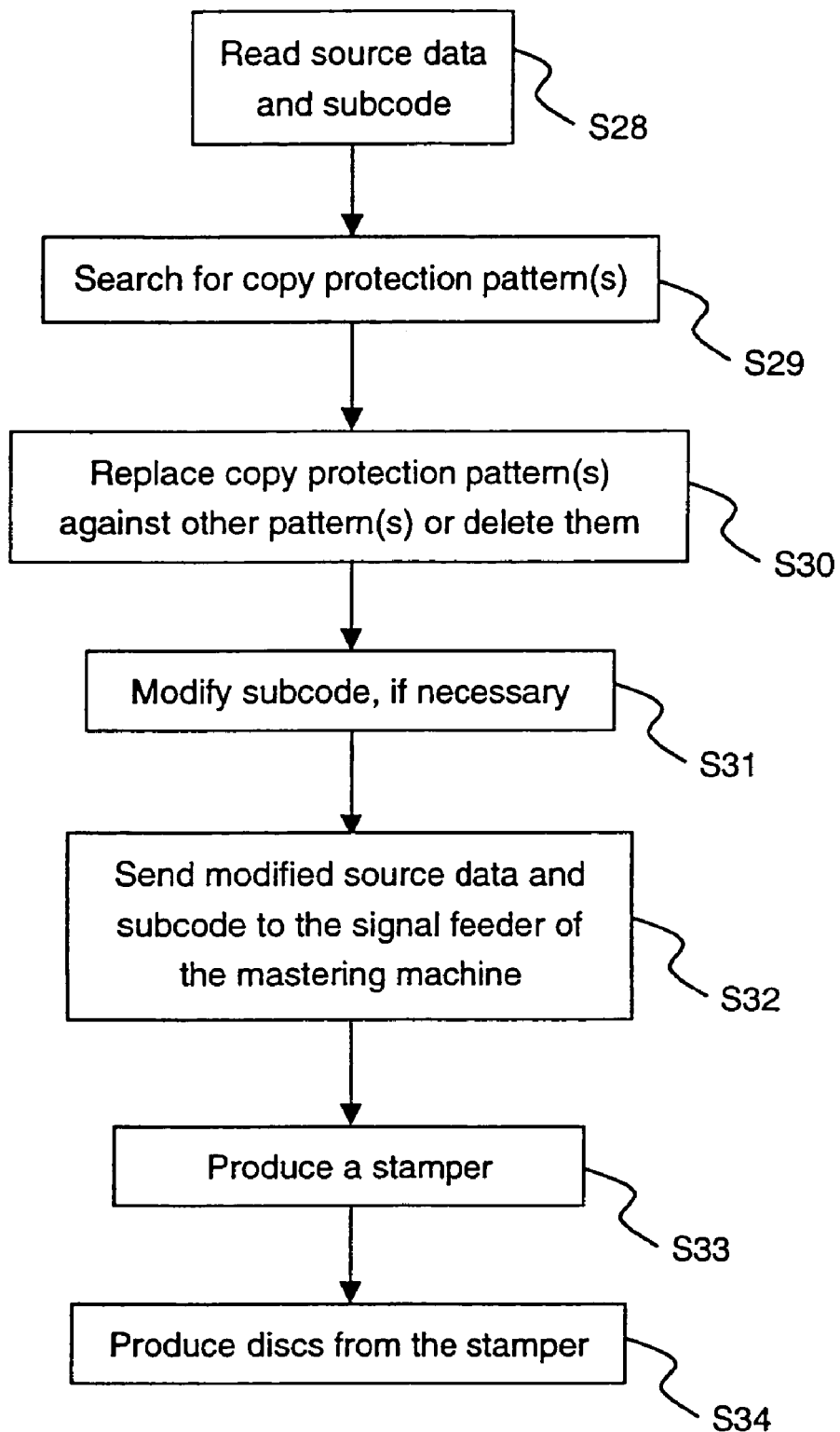
FIG. 9 illustrates a flow chart elucidating a second possibility to copy an audio record carrier according to the present invention.

FIG. 9 illustrates a flow chart elucidating a second possibility to copy an audio record carrier according to the present invention. In a first step S28 the source data and subcode to be copied is read, e.g. from an original audio record carrier or a data base storing the content of an original audio record carrier. Thereafter, in a second step S29 copy protection pattern(s) according to the present invention are searched. Following the searching of the copy protection patterns, these patterns are replaced against other patterns or deleted in a third step S30. In a next fourth step S31 the subcode gets modified, if this is necessary, e.g. start time information is adapted (the first to fourth steps S28 to S31 are similar to the first to fourth steps S22 to S25 of the first possibility to copy an optical audio record carrier shown in FIG. 8). Further, in a following fifth step S32 the modified source data (not including the copy protection patterns) and the eventually modified subcode is sent to the signal feeder of a mastering machine. Finally, in a sixth step S33 all steps necessary to produce a stamper are performed and in a seventh step S34 discs are produced from the stamper.

Figure 10:
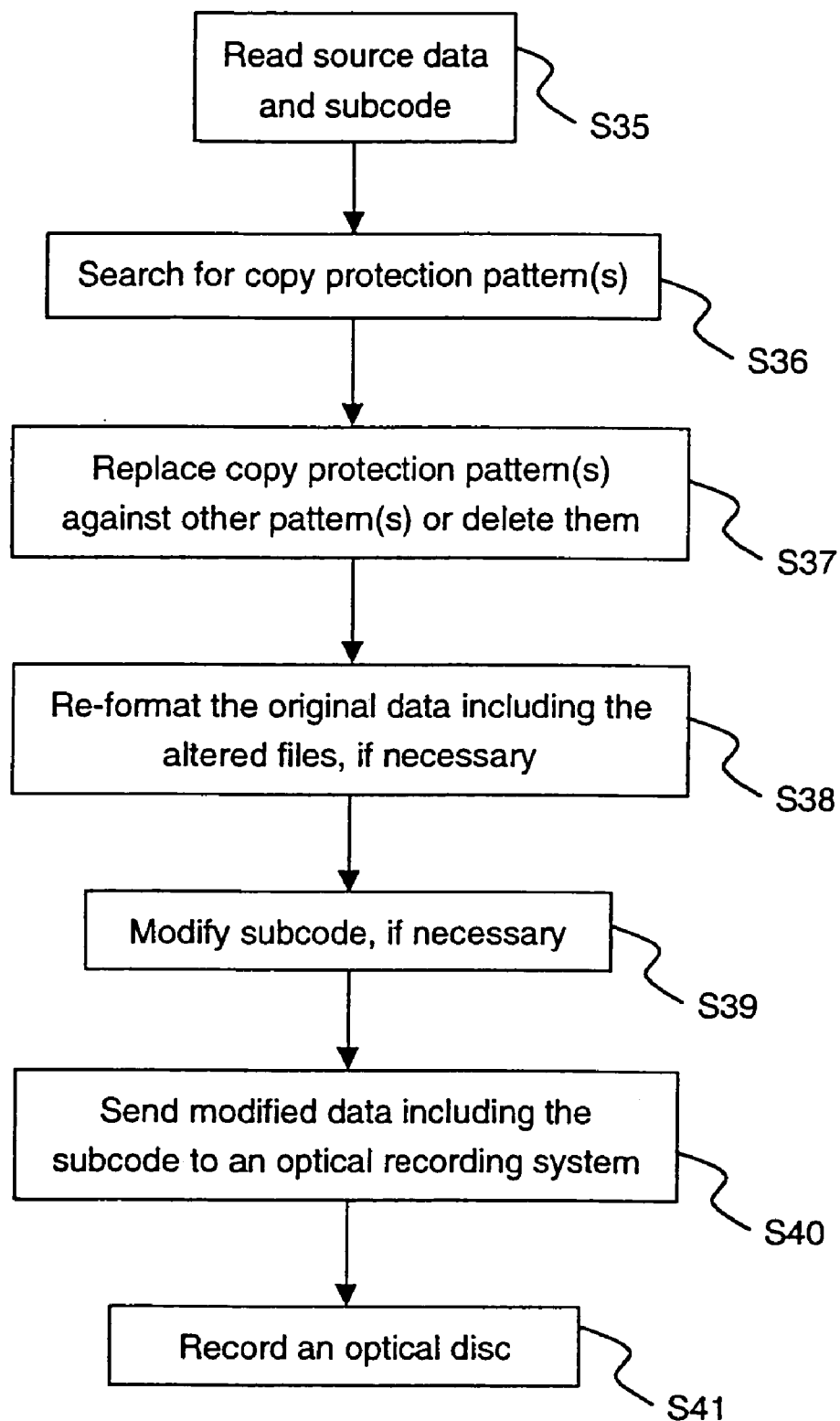
FIG. 10 illustrates a flow chart elucidating a first possibility to copy a digital data record carrier according to the present invention.

FIG. 10 illustrates a flow chart elucidating a first possibility to copy a digital data record carrier according to the present invention. In a first step S35 the source data and subcode to be copied is read, e.g. from an original digital data record carrier or a data base storing the digital data content of an original data record carrier. Thereafter, in a second step S36 copy protection pattern(s) according to the present invention are searched. Following the searching of the copy protection patterns, these patterns are replaced against other patterns or deleted in a third step S37 (the first to third steps S35 to S37 are basically similar to the first to third steps S22 to S24 of the first possibility to copy an optical audio record carrier shown in FIG. 8). In a following fourth step S38 the source data including the eventually altered files are re-formatted, if this is necessary. In a next fifth step S39 the subcode gets modified, if this is necessary, e.g. start time information is adapted. Further, in a following sixth step S40 the modified source data and the eventually modified subcode is sent to an optical recording system, e.g. of a PC. Finally, in a seventh step S41 an optical disc is recorded by the optical recording system (the fifth to seventh steps S39 to S41 are basically similar to the fourth to sixth steps S25 to S27 of the first possibility to copy an optical audio record carrier shown in FIG. 8).

Figure 11:
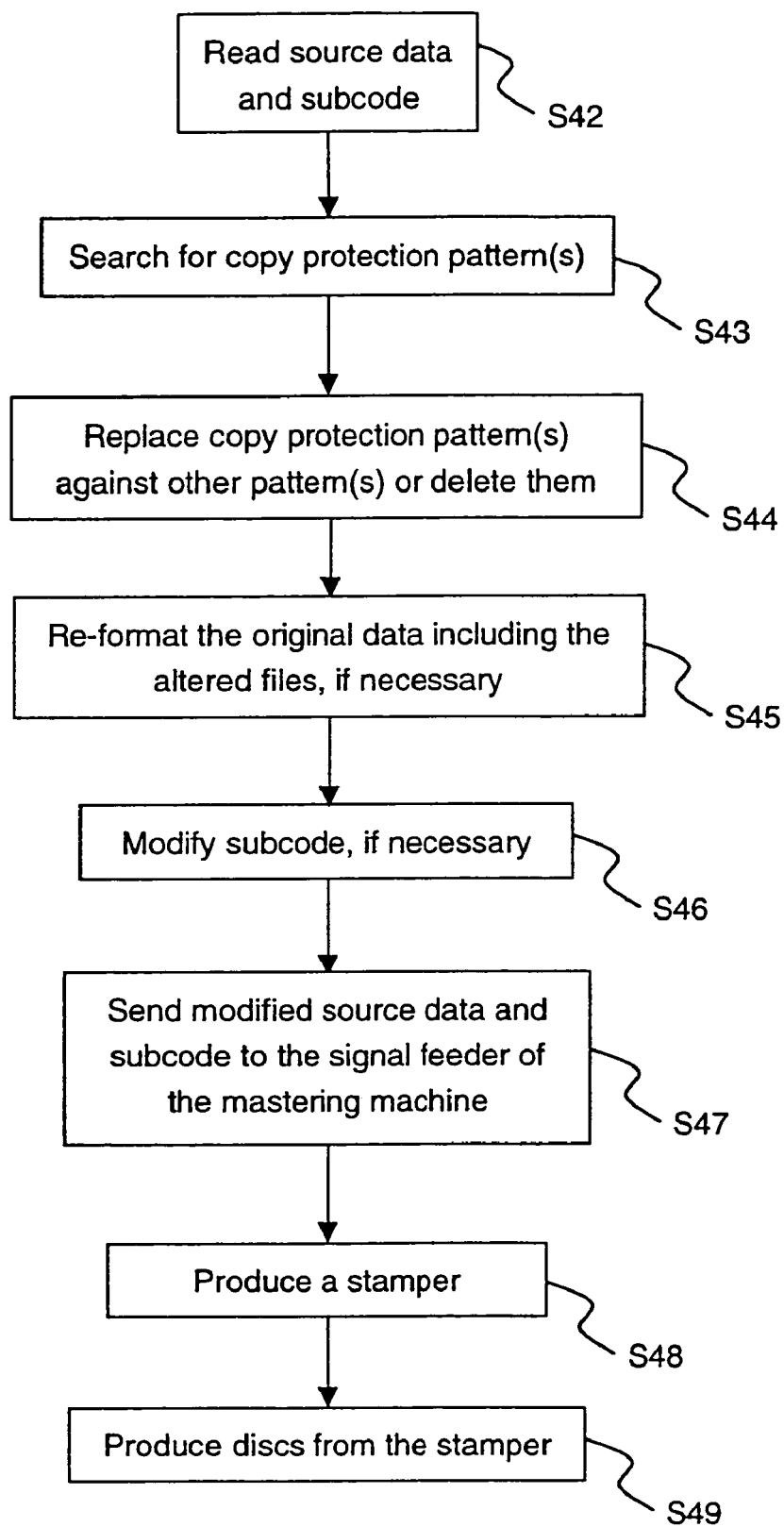
FIG. 11 illustrates a flow chart elucidating a second possibility to copy a digital data record carrier according to the present invention.

FIG. 11 illustrates a flow chart elucidating a second possibility to copy a digital data record carrier according to the present invention. In a first step S42 the source data and subcode to be copied is read, e.g. from an original digital data record carrier or a data base storing the content of an original digital data record carrier. Thereafter, in a second step S43 copy protection pattern(s) according to the present invention are searched. Following the searching of the copy protection patterns, these patterns are replaced against other patterns or deleted in a third step S43 (the first to third steps S42 to S44 are basically similar to the first to third steps S28 to S30 of the second possibility to copy an optical audio record carrier shown in FIG. 9). In a following fourth step S45 the source data including the eventually altered files are re-formatted, if this is necessary. In a next fifth step S46 the subcode gets modified, if this is necessary, e.g. start time information is adapted. Further, in a following sixth step S47 the modified source data (not including the copy protection patterns) and the eventually modified subcode is sent to the signal feeder of a mastering machine. Finally, in a seventh step S48 all steps necessary to produce a stamper are performed and in an eighth step S49 discs are produced from the stamper (the fifth to eighth steps S46 to S49 are basically similar to the fourth to seventh steps S31 to S34 of the second possibility to copy an optical audio record carrier shown in FIG. 9).

To elucidate the difference for an unprotected record carrier and a record carrier protected according to the present invention, the 'original layout', i.e. the layout of an unprotected record carrier, and the 'changed layout', i.e. one possibility of a layout of a record carrier protected according to the present invention, are shown in FIGS. 12 and 13. FIG. 12 illustrates a data structure of an audio record carrier with and without the predetermined repetitive bit pattern according to the present invention and FIG. 13 illustrates a data structure of a digital data record carrier with and without the predetermined repetitive bit pattern according to the present invention. The respective Fig. a shows the respective 'original layout' and the respective Fig. b shows the respective 'changed layout'.

Figure 12A:
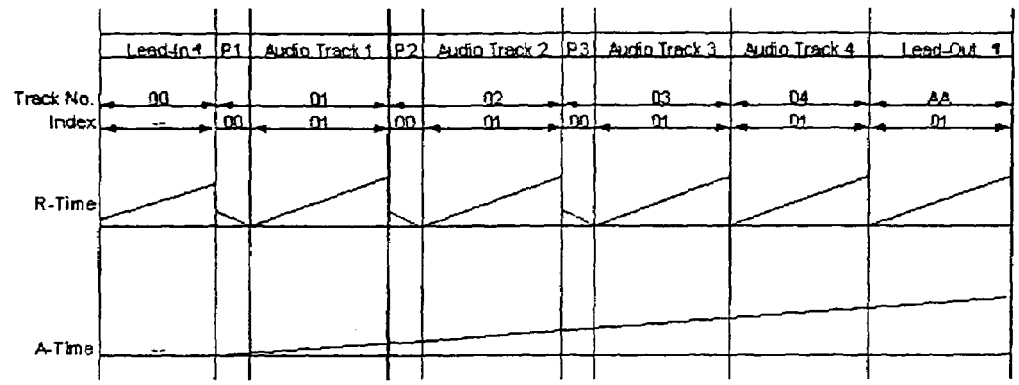
FIG. 12 illustrates a data structure of an audio record carrier with and without the predetermined repetitive bit pattern according to the present invention.

FIG. 12a shows the original layout of an audio CD with a first lead-in section Lead-In 1, first to fourth audio tracks Audio Track 1 to 4, and a first lead-out section Lead-Out 1. Before the first three audio tracks Audio Track 1 to 3 a respective pause section of first to third pause sections P1 to P3 is arranged. FIG. 12a shows the track number Track No. of each track, the index number Index of each section, the relative time, i.e. the time of each track, and the absolute time, i.e. the total time of the disc.

The first lead in section Lead-In 1 has the track number 00 and no index number. The following first pause section P1 before the first audio track Audio Track 1 has the track number 01 and the index number 00. The first audio track Audio Track 1 has the track number 01 and the index number 01. The following second pause section P2 before the second audio track Audio Track 2 has the track number 02 and the index number 00. The second audio track Audio Track 2 has the track number 02 and the index number 01. The following third pause section P3 before the third audio track Audio Track 3 has the track number 03 and the index number 00. The third audio track Audio Track 3 has the track number 03 and the index number 01. The following fourth audio track Audio Track 4 has the track number 04 and the index number 01. The following first lead-out section Lead-Out 1 has the track number AA and the index number 01. The four audio tracks Audio Track 1 to 4, and the first lead-out section Lead-Out 1 have a respective relative time R-Time which counts up from zero to the real time corresponding to the respective section length. The three pause sections P1 to P3 have a respective relative time R-Time which counts down from the real time corresponding to the respective section length to zero. The absolute time of the disc A-Time counts up from the beginning of the first pause section P1 to the real time corresponding to the end of the first lead-out section Lead-Out 1.

Figure 12B:
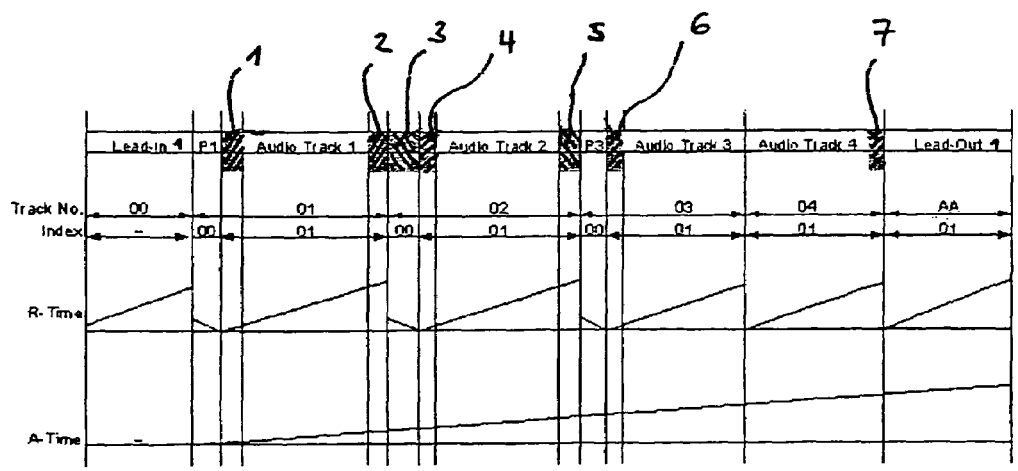

FIG. 12b shows the changed layout of an audio CD according to one exemplary embodiment of the present invention which comprises first to seventh sections 1 to 7 comprising predetermined repetitive bit pattern(s) according to the present invention additionally to the original layout shown in FIG. 12a with a first lead-in section Lead-In 1, four tracks Audio Track 1 to 4, three pause sections P1 to P3, and a first lead-out section Lead-Out 1.

The first, fourth, and sixth sections 1, 4, and 6 are respectively arranged at (or directly after) the respective index change from 00 to 01. A player will position it's reading optic at this respective position in case a track is directly selected. The predetermined repetitive bit pattern(s) according to the present invention are very efficient in such an area, since many players generally need a long time to start playback or abort when such a direct positioning should be performed on a recordable record carrier.

The second, fifth, and seventh sections 2, 5, and 7 are respectively arranged at the end of a track (section 2 at the end of the first track Audio Track 1, section 5 at the end of the second track Audio Track 2, and section 7 at the end of the fourth track Audio Track 4). They enhance the efficiency of the copy protection scheme according to the present invention, in particular if they prolong the total duration of the predetermined repetitive bit pattern(s) according to the present invention, i.e. are arranged directly before or after another section comprising the predetermined repetitive bit pattern(s) according to the present invention.

The third section 3 is arranged over the whole second pause section P2 and therewith prolongs the total time of the predetermined repetitive bit pattern(s) according to the present invention by 'connecting' the second and the fourth sections 2 and 4. CD players show more problems with long uninterrupted sections or uninterrupted connections of sections comprising the predetermined repetitive bit pattern(s) according to the present invention than with short.

The sections comprising the predetermined repetitive bit pattern(s) according to the present invention are additionally inserted to the audio data when being arranged before or after audio data and replace pause audio data, i.e. the first, second, and fourth to seventh sections 1, 2, and 4 to 7 are additionally inserted and the third section 3 replaces pause audio data.

In this example all pauses P1, P2, and P3 each have a length of 2 seconds and all tracks Audio Track 1, Audio Track 2, Audio Track 3, and Audio Track 4 each have a length of 1 minute 30 seconds. The length of the first, second, fourth, fifth, sixth, and seventh sections 1, 2, 4, 5, 6, and 7 each have a length of 1 second, the third section 3 has a length corresponding to that of the second pause P2. Therefore, the start times of the tracks which are shown (besides other information) in the table of contents TOC of the audio disc, have to be changed as follows:

Original TOC Track Start Times of the Audio Disc

Track A-Time
01 00:02:00
02 01:34:00
03 03:06:00
04 04:36:00
AA 06:06:00

Modified TOC Track Start Times of the Audio Disc

Track A-Time
01 00:02:00
02 01:36:00
03 03:10:00
04 04:41:00
AA 06:12:00

Figure 13A:
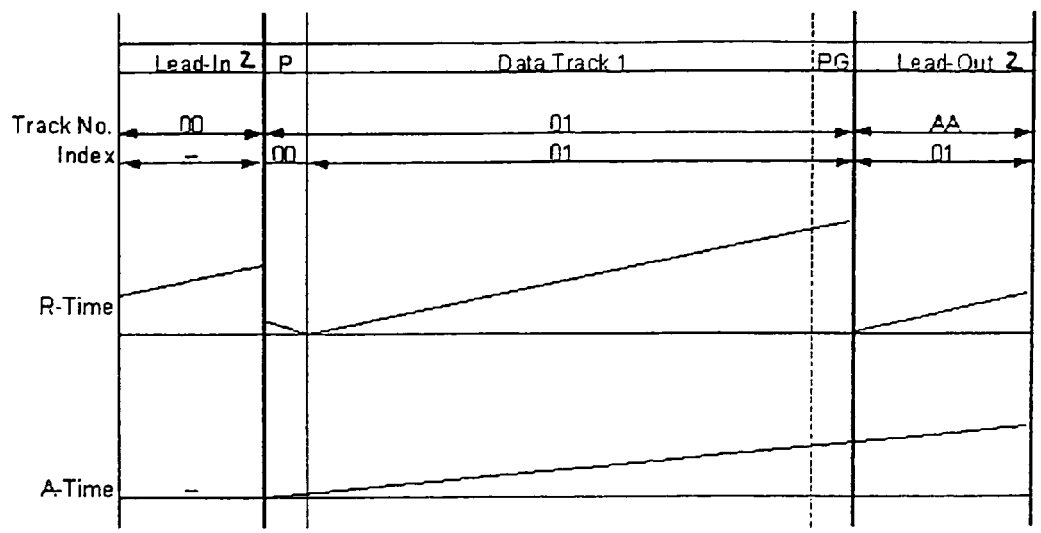
FIG. 13 illustrates a data structure of a digital data record carrier with and without the predetermined repetitive bit pattern according to the present invention.

FIG. 13a shows the original layout of a data disc with a second lead-in section Lead-In 2, a data track Data Track 1, and a second lead-out section Lead-Out 2. Before the data track Data Track 1 a pregap section P is arranged and after the data track Data Track 1 a postgap section PG is arranged.

FIG. 13a shows the track number Track No. of each track, the index number Index of each section, the relative time, i.e. the time of each track, and the absolute time, i.e. the total time of the disc.

The second lead in section Lead-In 2 has the track number 00 and no index number. The following pregap section P before the data track Data Track 1 has the track number 01 and the index number 00. The data track Data Track 1 has the track number 01 and the index number 01. The following postgap section PG has no individual track and index numbers. The following second lead-out section Lead-Out 2 has the track number AA and the index number 01. The data track Data Track 1 including the following postgap section PG, and the second lead-out section Lead-Out 2 have a respective relative time R-Time which counts up from zero to the real time corresponding to the respective section length. The pregap section P has a relative time R-Time which counts down from the real time corresponding to the respective section length during access to zero. The absolute time of the disc A-Time counts up from the beginning of the pregap section P to the real time corresponding to the end of the second lead-out section Lead-Out 2.

Figure 13B:
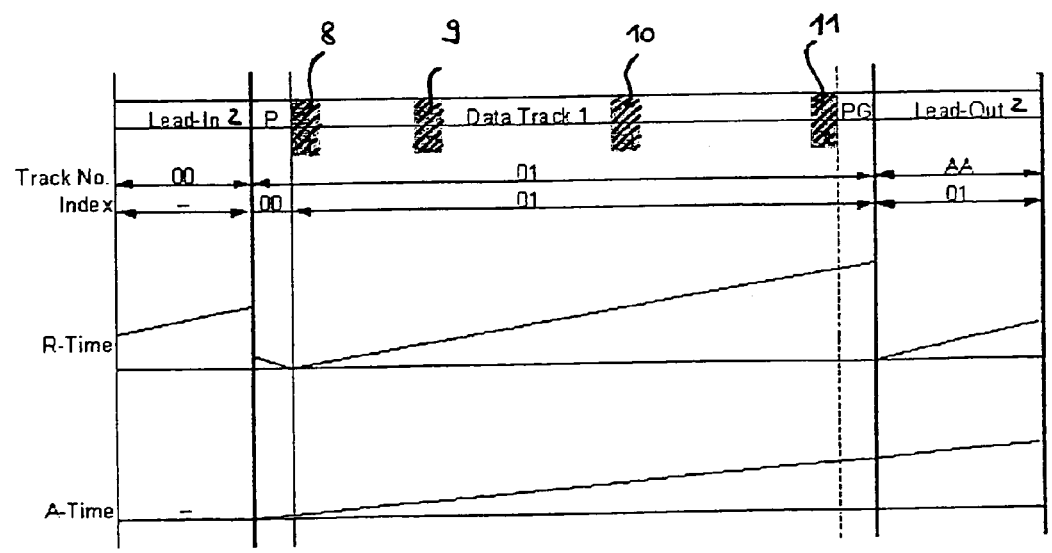

FIG. 13b shows the changed layout of a data CD according to one exemplary embodiment of the present invention which comprises eighth to eleventh sections 8 to 11 comprising predetermined repetitive bit pattern(s) according to the present invention additionally to the original layout shown in FIG. 13a with a second lead-in section Lead-In 2, a data track Data Track 1, a pregap section P, a postgap section PG, and a second lead-out section Lead-Out 2.

The eighth section 8 is arranged at (or directly after) the respective index change from 00 to 01. A player will position it's reading optic at this respective position when a disc is inserted into the player and data is retrieved from the disc. As mentioned above, the predetermined repetitive bit pattern(s) according to the present invention are very efficient in such an area, since many players, in this case CD-ROM readers, generally need a long time to start playback or refuse to read the disc when a recordable record carrier is used.

The ninth and tenth sections 9 and 10 are respectively arranged within the data track. The predetermined repetitive bit pattern(s) according to the present invention might be inserted as 'dummy data' at the end of files as an addition to the user data, or might be stored as 'dummy files' which do not store any user data, but only the predetermined repetitive bit pattern(s) according to the present invention.

The eleventh section 11 is arranged at the end of the data track. It enhances the efficiency of the copy protection scheme according to the present invention.

The sections comprising the predetermined repetitive bit pattern(s) according to the present invention may replace existing data (e.g. 00-data) or are additionally inserted to the original data (e.g. when 'dummy files' are added within the data structure or 'dummy data' is arranged at the end of the data track.

In this example the pregap section P has a length of 2 seconds and the data track Data Track 1 including the postgap section PG has a length of 15 minutes 00 seconds. Therefore, in case the eighth section 8 replaces 00-data and the ninth to eleventh sections 9 to 11 each have a length of 1 second, the start times of the tracks which are shown (besides other information) in the table of contents TOC of the data disc, have to be changed as follows:

Original TOC Track Start Times of the Data Disc

Track A-Time
01 00:02:00
AA 15:02:00

Modified TOC Track Start Times of the Data Disc

Track A-Time
01 00:02:00
AA 15:05:00

Of course, the track structure of the modified audio and data discs according to the present invention fulfil the requirements of the Red-Book, Yellow-Book or IEC-908, in which standards the different used terms such as pause, pregap, postgap, track, index, A-Time, R-Time and TOC are further explained.

According to the present invention, as other copy protection methods, also both methods of confusing decoding as shown in the above referenced WO 01/78074, i.e. the confusion of the clock regeneration and confusion of synchronization and timing can be used for copy prevention together with the copy protection scheme according to the present invention. Further, also the arrangement of a recursive session pointer as shown in the above referenced WO 01/78074 might be used alone or in combination with said confusing decoding together with the copy protection scheme according to the present invention. However, in such a case the advantage of the present invention that general purpose reading devices, like CD-ROM readers, can access the copy protected record carriers might get lost.

Similar modifications as elucidated above for CDs can be done for DVD, which uses similar layout of the signal and for the decoding process.

The invention claimed is:

1. A method for producing a copy protected record carrier for digital data, comprising:
   determining at least one predetermined repetitive bit pattern which encodes into channel bits having an accumulated digital sum value that exceeds a first predetermined limit and that is below a second predetermined limit;
   replacing at least one part of the digital data to be recorded by the at least one predetermined repetitive bit pattern and/or inserting the at least one predetermined repetitive bit pattern into at least one part of the digital data to be recorded; and
   transferring the digital data, including the at least one replaced and/or inserted part, onto the record carrier by a mastering process so that the accumulated digital sum value, which exceeds the first predetermined limit and is below the second predetermined limit, is achieved in the at least one replaced and/or inserted part,
   wherein said predetermined repetitive bit pattern is selected so that an abnormal writing beam deviation from an ideal position of a writing beam of a record carrier recording device for recordable record carriers is large enough to ensure that a writing process will be aborted or disturbed.

2. A method for producing a copy protected record carrier for digital data, comprising:
   determining at least one predetermined repetitive bit pattern which encodes into channel bits having an accumulated digital sum value that exceeds a first predetermined limit and that is below a second predetermined limit;
   replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastering process so that the accumulated digital sum value, which exceeds the first predetermined limit and is below the second predetermined limit, is achieved in the at least one replaced and/or inserted part, wherein the predetermined repetitive bit pattern is selected so as to cause an abnormal writing beam deviation from an ideal position of a writing beam of a record carrier recording device for recordable record carriers, and is selected so as to cause an abnormal reading beam deviation from an ideal position of a reading beam of a record carrier reading device which reads a copy of the copy protected record carrier recorded on a recordable record carrier, wherein the combined effect of writing beam deviation and reading beam deviation is large enough to ensure that a reading process will be aborted or disturbed.

3. A method for producing a copy protected record carrier for digital data, comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastenng process so that the accumulated digital sum value, which exceeds the first predetermined limit and is below the second predetermined limit, is achieved in the at least one replaced and/or inserted part, wherein said predetermined repetitive bit pattern is selected so that merge bits are predefined and not changeable by recording electronics of a recorder due to design rules of a digital data content of the record carrier.

4. A method for producing a copy protected record carrier for digital data, comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastenng process so that the accumulated digital sum value, which exceeds the first predetermined limit and is below the second predetermined limit, is achieved in the at least one replaced and/or inserted part, wherein for audio digital data, the predetermined repetitive bit pattern is selected so that a low analog audio DC value is achieved.

5. A method for producing a copy protected record carrier for digital data, comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastenng process so that the accumulated digital sum value, which exceeds the first predetermined limit and is below the second predetermined limit, is achieved in the at least one replaced and/or inserted part, wherein for audio digital data, said predetermined repetitive bit pattern is selected so that an equal analog audio DC value in all audio channels is achieved.

6. A method for producing a copy protected record carrier for digital data, comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastering process so that the accumulated digital sum value, which exceeds the first predetermined limit and is below the second predetermined limit, is achieved in the at least one replaced and/or inserted part, wherein for audio digital data, said predetermined repetitive bit pattern is selected so that an audio output signal corresponding to the digital data is achieved, wherein the analog audio output signal has a frequency and/or amplitude which cannot be heard or can hardly be heard by humans.

7. A method for producing a copy protected record carrier for digital data, comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastering process so that the accumulated digital sum value, which exceeds the first predetermined limit and is below the second predetermined limit, is achieved in the at least one replaced and/or inserted part, wherein for audio digital data, before and after the predetermined repetitive bit pattern, a ramp signal is added that ensures a smooth transition from and to the digital data signal content before and after the signal content of the predetermined repetitive bit pattern.

8. A computer program product comprising computer program means emebedded on a computer-readable medium, the computer programs means configured to perform the steps recited in claim 1 when executed on a computer, or a digital signal processor.

9. A device configured to produce a record carrier with copy protection comprising:

a first unit for replacing at least one part of the digital data to be recorded by at least one predetermined repetitive bit pattern and/or for inserting the at least one predetermined repetitive bit pattern into at least one part of the digital data to be recorded, wherein the repetitive bit pattern encodes into channel bits having an accumulated digital sum value that exceeds a first predetermined limit and that is below a second predetermined limit, and a second unit for transferring the digital data including the at least one replaced and/or inserted part to a record carrier production unit which produces the record carrier by a mastering process so that the accumulated digital sum value that exceeds a first predetermined limit and is below a second predetermined limit is achieved in the at least one replaced and/or inserted part, wherein said at least one predetermined repetitive bit pattern is selected so that an abnormal writing beam deviation from an ideal position of a writing beam of a record carrier recording device for recordable record carriers is large enough to ensure that a writing process will be aborted or disturbed.

10. A copy protected record carrier, comprising:

at least one part including at least one predetermined repetitive bit pattern which encodes into channel bits having an accumulated digital sum value that exceeds a first predetermined limit and is below a second predetermined limit, wherein the at least one predetermined repetitive bit pattern is selected so that an abnormal writing beam deviation from an ideal position of a writing beam of a record carrier recording device for recordable record carriers is large enough to ensure that a writing process will be aborted or disturbed.

11. A method for making a copy protected carrier having at least one part with at least one predetermined repetitive bit pattern that encodes into channel bits having an accumulated digital sum value that exceeds a first predetermined limit and is below a second predetermined limit, the method comprising:

determining at least one predetermined repetitive bit pattern which encodes into channel bits having an accumulated digital sum value that exceeds a first predetermined limit and that is below a second predetermined limit;

replacing at least one part of the digital data to be recorded by the at least one predetermined repetitive bit pattern and/or inserting the at least one predetermined repetitive bit pattern into at least one part of the digital data to be recorded; and transferring the digital data, including the at least one replaced and/or inserted part, onto the record carrier by a mastenng process so that the accumulated digital sum value, which exceeds the first predetermined limit and is below the second predetermined limit, is achieved in the at least one replaced and/or inserted part, wherein the predetermined at least one repetitive bit pattern is selected so that an abnormal writing beam deviation from an ideal position of a writing beam of a record carrier recording device for recordable record carriers is large enough to ensure that a writing process will be aborted or disturbed.

* * * * *